(12) United States Patent
Melchert et al.

(10) Patent No.: US 10,785,987 B2
(45) Date of Patent: Sep. 29, 2020

(54) THREAD DISPENSING DEVICE

(71) Applicant: Poly-clip System GmbH & Co. KG, Hattersheim (DE)

(72) Inventors: Uwe Melchert, Frankfurt (DE); Santino Lerose, Friedrichsdorf (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 21 days.

(21) Appl. No.: 16/164,299

(22) Filed: Oct. 18, 2018

(65) Prior Publication Data
US 2019/0116815 A1 Apr. 25, 2019

(30) Foreign Application Priority Data

Oct. 19, 2017 (EP) .................................... 17197262

(51) Int. Cl.
*A22C 11/00* (2006.01)
*A22C 11/12* (2006.01)
*B65H 51/10* (2006.01)
*A22C 11/02* (2006.01)
*B65H 57/00* (2006.01)

(52) U.S. Cl.
CPC ............ *A22C 11/127* (2013.01); *A22C 11/02* (2013.01); *A22C 11/122* (2013.01); *A22C 11/125* (2013.01); *B65H 51/10* (2013.01); *B65H 57/00* (2013.01)

(58) Field of Classification Search
CPC ..... A22C 11/00; A22C 11/02; A22C 11/0245; A22C 11/127; A22C 11/11; A22C 11/107
USPC .................. 452/30–32, 35–37, 46–48, 51
See application file for complete search history.

(56) References Cited

U.S. PATENT DOCUMENTS

| 4,694,537 A * | 9/1987 | Kollross | A22C 15/002 |
| | | | 452/48 |
| 7,331,155 B2 * | 2/2008 | Topfer | A22C 11/125 |
| | | | 29/243.56 |
| 2007/0254571 A1 * | 11/2007 | Gladh | A22C 11/104 |
| | | | 452/32 |
| 2008/0220704 A1 * | 9/2008 | Ebert | A22C 11/10 |
| | | | 452/35 |

(Continued)

FOREIGN PATENT DOCUMENTS

| EP | 0048507 A1 | 3/1982 |
| EP | 0872184 A1 | 10/1998 |
| EP | 1844659 A1 | 10/2007 |

OTHER PUBLICATIONS

EPO; Application No. 17197262.3; European Search Report dated Nov. 29, 2017.

*Primary Examiner* — Richard T Price, Jr.
(74) *Attorney, Agent, or Firm* — Fitch, Even, Tabin & Flannery LLP

(57) ABSTRACT

The present invention relates to a method and device for dispensing thread. The thread dispensing device comprises a transport unit having at least a first and a second transport element for a defined transport of the thread, a drive unit for driving the first and second transport element and a shifting unit for reversibly shifting the first transport element relative to the second transport element. The present invention further relates to a clipping machine and a method for producing sausage-shaped products, wherein the clipping machine comprises the inventive device for dispensing thread.

15 Claims, 5 Drawing Sheets

(56) References Cited

U.S. PATENT DOCUMENTS

2014/0194041 A1\* 7/2014 Pitzer .................. A22C 11/006
 452/49
2015/0223478 A1\* 8/2015 Ebert .................. A22C 11/125
 452/35

\* cited by examiner

THREAD DISPENSING DEVICE

CROSS-REFERENCE TO RELATED APPLICATION

The present application claims the benefit of priority of European Patent Application No. 17197262.3 filed on Oct. 19, 2017, the contents of which are incorporated herein by reference in their entirety.

FIELD OF THE INVENTION

The present invention relates to a dispensing device for dispensing thread and a method for dispensing thread. The present invention further relates to a clipping machine for producing sausage-shaped products, which includes a dispensing device for dispensing thread and a method for producing sausage-shaped products.

BACKGROUND OF THE INVENTION

In various production processes, filaments or ribbons are used, e.g. when being attached to a product as a suspension element or a handle for manipulating the product. The filament or ribbon may also become part of the product or could be the product itself, like a string of adhesive, e.g. hot melt adhesive, or a plastic string processed in a 3D-printer. In all these cases, it is necessary to dispense or feed, respectively, the filament, ribbon or string with a defined speed and in predetermined lengths according to the product to be produced and/or specific process parameters.

In the following, the term "thread" is used as a representative for filaments, ribbons or any other longitudinally extending string-shaped elements or the like.

One exemplary field in which thread dispensing devices can be used, is the production of sausage-shaped products or sausages, in particular ring-shaped sausages. For producing such ring-shaped sausages, the front end of a thread is attached to the front end of a tubular casing to be filled with a filling material, by a closure clip which closes the front end of said tubular casing and which is attached via closing means. During the filling of the tubular casing, a defined length of thread is dispensed or fed, respectively. By continuing the filling of the tubular casing and holding or detaining the thread, the tubular casing forms a ring or at least a segment of a ring. After the ring-shaped sausage has reached a predefined size or form, respectively, the rear end of the filed tubular casing is gathered by gathering means and closed by a further closure clip via said closing means. The thread is caught by the gathering means and attached to the rear end of the ring-shaped sausage by said closure clip. Subsequently, the ring-shaped sausage just produced and provided with the thread connecting both ends of said sausage, is cut-off from the remaining supply of tubular casing and supply of thread, respectively.

A string or thread feeder disclosed in EP patent 0 872 184, has a thread drive including two toothed wheels between which the thread is arranged for being fed, with one of the toothed wheels driven by a pneumatic actuated rocker arm. A retraction of the thread already dispensed, is enabled by an additional pneumatic piston/cylinder arrangement.

In other machines for producing sausage-shaped products, the thread is also used for closing the front end as well as the rear end of the tubular casing. In such machines, the filled tubular casing is gathered and the thread is fed to the gathered portion. A knot is formed and closed about said gathered portion.

From DE patent application 41 15 994, a machine for producing sausage-shaped products is known in which a thread is forwarded to the gathered portion of a filled tubular casing. The thread is fed by a motor into a closing region of the machine at which a knot is formed and tightly closed by a thread pulling mechanism.

It is an object of the present invention to provide a dispensing device and a method for dispensing thread which may be used in various applications, and which may easily be adapted to a specific application and to various process parameters. It is a further object of the present invention to provide a method and a clipping machine for producing sausage-shaped products which includes the inventive dispensing device for dispensing thread.

SUMMARY OF THE INVENTION

According to the present invention, there is provided a device for dispensing or feeding a thread, comprising a transport unit having at least a first and a second transport element for a defined transport of a thread, a drive unit for driving the first and second transport element and a shifting unit for reversibly shifting the first transport element relative to the second transport element.

In the inventive device for dispensing thread, or the inventive thread dispensing device, thread or a thread is transported by driving the first and second transport elements with the thread positioned there between. Thus, the transport of the thread is carried out actively. When reversibly shifting the first transport element relative to the second transport element, the thread may be inserted or removed from the thread dispensing device. Moreover, the thread transport may be started or stopped or interrupted, independently from the operation state of the drive unit, e.g. in an emergency case.

In a preferred embodiment of the inventive thread dispensing device, the first and second transport elements are at least approximately cylindrical rollers having rotation axes which are arranged parallel to each other. Moreover, the rollers have preferably and at least approximately the same diameter. This specific design enables the processing of various kinds of thread or thread material, e.g. of different diameter or cross-sectional shape or different quality. Thereby, not only thread of round cross-section may be processed, but also thread with a rectangular cross-section or ribbon. Moreover, the danger of the thread escaping from the transport unit is reduced.

It has to be noted that various kinds of material may be used for the rollers of the transport unit, like plastic or metal, e.g. dependent on the kind of thread to be treated.

Additionally, the first and second transport elements may be provided with a surface coating, e.g. rubber, for further enhancing the transportation properties.

In a further preferred embodiment of the inventive thread dispensing device, the shifting unit includes guide means for reversibly guiding the first transport element preferably in a common vertical plane away from and back to the second guide element. In preferred arrangements, the first transport element is shifted at least approximately parallel to the second transport element or is shifted along a trajectory. The guide means ensures that the transport of thread may be started or stopped without damaging the thread, namely by preventing slip between the rollers and the thread as well as preventing wear. Thereby, the reliability of the production process in which the inventive thread dispensing device is used, is improved.

Advantageously, the transportation unit is coupled to the drive unit via a gear unit. By means of the gear unit, the transportation speed may be set to a base level.

Additionally, the gear unit may be designed such that both, the first and the second transport element, are driven at identical speeds. This prevents slippage between the first and the second transport element, and thus, also slippage between one of the drive elements and the thread being transported. Thereby, a careful transport of thread is enabled, without damaging the thread.

Further advantageously, the drive unit includes a stepper motor controlled by a control unit. The use of a stepper motor allows feeding any defined length of thread. Furthermore, since the stepper motor is controlled by a control unit, different programs may be stored in said control unit, on the basis of which the stepper motor may be operated. Thus, it is possible to feed only one length of thread or more than one different lengths of thread. Also, thread may be retracted by the thread dispensing device, if necessary, and about one or more defined lengths, according to the respective program.

The control unit of the inventive thread dispensing device may be arranged at various locations. In a simple case, the control unit is integrated in the thread dispensing device. It is also possible that the control unit of the thread dispensing device is integrated in the control unit of a machine which uses the inventive thread dispensing device, like a clipping machine.

It is further possible to change the dispensing program also during the production process, e.g. during the production of two subsequent products. This allows the adaption of the production, e.g. to fluctuating features of the thread, product components, or the production machine.

For an easy and rapid change of the program of the thread dispensing device, a switch unit for selecting a predefined operation mode is provided at said device. This switch unit may be integrated in the control unit of the thread dispensing device, or may be arranged separately, for example to be reached easily by an operator. Naturally, the switch unit may also be integrated in the control unit of a machine which uses the inventive thread dispensing device, like a clipping machine.

The inventive thread dispensing device may further comprise a guide unit for guiding a thread through the dispensing device. The guide unit ensures the correct supply of thread to the transport unit of the thread dispensing device, particularly to the first and second transport element, and a defined lead out of thread from the thread dispensing device to a subsequent machine.

Additionally, the thread dispensing device may be provided with a cutting device for cutting the thread. The cutting device may be a manually operated cutting device which, in the simplest case, is a blade arranged at a frame element of the dispensing device. The cutting device allows an operator to cut-off the thread just used, e.g. at the end of the production process, or when a thread different from that presently used is selected for the further process, or to remove defective portions from the currently used thread, like weak points or knots. In a preferred embodiment, the cutting device is arranged downstream the transport unit, referred to the thread transport or feeding direction.

The shifting means for reversibly shifting the first transport element relative to the second transport element may be of any suitable construction. The shifting means may include automatic actuation means, like an additional motor that may be controlled by a respective program stored in the control unit of the thread dispensing device. In a preferred embodiment, the shifting means include a manually operable lever. This allows a compact design of the thread dispensing device with a reduced control effort.

Furthermore, there is provided a clipping machine for producing sausage-shaped products, like sausages, with a tubular or bag-shaped packaging casing containing a flowable filling material and a suspension element attached to the tubular or bag-shaped casing, wherein the suspension element consists of thread. The clipping machine comprises a filling tube on which the tubular or bag-shaped packaging casing is stored and through which filling material is fed in a feeding direction into the tubular or bag-shaped packaging casing, gathering means for gathering the filled tubular or bag-shaped packaging casing and for forming a plait-like portion thereto and a clipping device for applying at least one closure means, like a closure clip, to the plait-like portion for closing the just filled portion of the tubular or bag-shaped packaging casing. The clipping machine further comprises a device for dispensing thread according to the present invention. In a preferred embodiment, the thread dispensing device is arranged in an area above the clipping device. Of course, the thread dispensing device can be arranged below the clipping device or in a neighbourhood to the clipping device.

Further according to the present invention, there is provided a method for dispensing thread by a thread dispensing device, including the steps of:
  providing a supply of thread,
  feeding thread by at least a first and second transport element of a transport unit of the thread dispensing device, and
  reversibly shifting the first transport element relative to the second transport element for transporting thread or for interrupting the feeding of thread.

The present invention also provides a method for producing sausage-shaped products, like sausages, with a tubular or bag-shaped packaging casing containing a flowable filling material and a suspension element attached to the tubular or bag-shaped casing, wherein the suspension element consists of thread, including the steps of:
  feeding filling material through a filling tube in a feeding direction into the tubular or bag-shaped packaging casing,
  gathering the filled tubular or bag-shaped packaging casing and forming a plait-like portion thereto,
  applying at least one closure means, like a closure clip, to the plait-like portion for closing the just filled portion of the tubular or bag-shaped packaging casing,
  feeding thread by at least a first and second transport element of a transport unit of a thread dispensing device in a transportation direction, and
  reversibly shifting the first transport element relative to the second transport element for transporting thread or for interrupting the feeding of thread.

The method further comprises the step of guiding thread through a guide unit of the dispensing device.

The method may also comprise the step of selecting a predefined operation mode for operating the thread dispensing device.

The clipping machine equipped with the thread dispensing device according to the present invention, the method for producing sausage-shaped products as well as the method for dispensing thread provide all advantages as explained in conjunction with the inventive thread dispensing device alone.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 1:
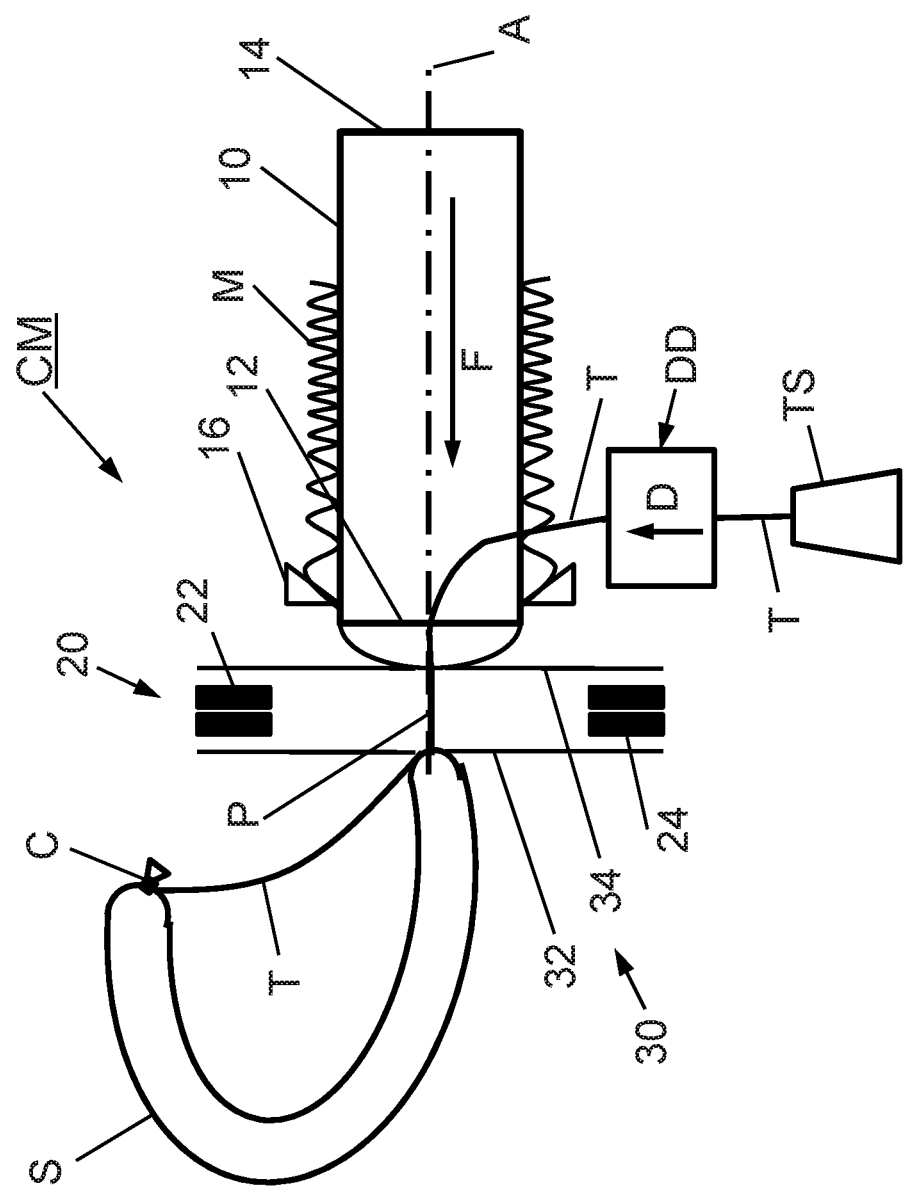
FIG. 1: is a schematic view showing the principal design of a clipping machine.

A clipping machine CM for producing sausage-shaped products S shown schematically in FIG. 1, comprises, as main components, a filling tube 10 having a longitudinally and horizontally extending center axis A, with a discharge opening for discharging a filling material at its left end 12 and a feeding opening for feeding in a feeding direction F the filling material to the discharge opening of filling tube 10, for example by a feeding pump (not shown), at its right end 14, and a casing brake assembly 16 arranged coaxially with filling tube 10 in the region of the left end 12 of filling tube 10. Filling tube 10 is made of a suitable material, like stainless steel. A supply of tubular packaging casing M made of a thin sheet material is stored on filling tube 10. From the supply of tubular packaging casing M, tubular packaging casing M is pulled-off during the process of manufacturing the sausage-shaped products S, in particular by the feeding pressure for filling the filling material into tubular packaging casing M.

Clipping machine CM further comprises a clipping device 20 for closing a filled tubular packaging casing M by applying closure means, like closure clips C, to a plait-like portion P, and gathering means 30 for gathering the filled tubular packaging casing M and for forming said plait-like portion P thereto. These components are all arranged downstream filling tube 10.

As can be inferred from FIG. 1, clipping device 20 is positioned immediately downstream left end 12 of filling tube 10, and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the just filled tubular packaging casing M, or may apply and close two closure clips C at the same time, a first closure clip C for closing the rear end of the just filled tubular packaging casing M for forming a sausage-shaped product S, and a second closure clip C for closing the front end of a tubular packaging casing M subsequently to be filled. Gathering means 30 include a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P.

For discharging a sausage-shaped product S just produced from clipping machine CM, downstream clipping device 20, a discharge device may be arranged, which may comprise a conveyor belt and guide rollers. In a simple case, the discharge device may be a chute.

In the clipping machine CM according to FIG. 1, ring-shaped sausage products may be produced. For forming tubular packaging casing M into a ring shape while being filled, a thread T is dispensed to clipping machine CM by a device for dispensing a thread or a thread dispensing device DD in a dispensing direction D.

Thread dispensing device DD can be arranged below filling tube 10 or clipping device 20. In another arrangement of thread dispensing device DD, it can be provided above filling tube 10 or clipping device 20. The latter allows a more easy operation of the device DD by an operator.

Thread T is attached to the front end of the tubular packaging casing M to be filled by a closure clip C that closes the front end of tubular packaging casing M. Thread T dispensed or fed by thread dispensing device DD to clipping machine CM is received from a supply of thread T or thread supply TS, like a spool, transported through thread dispensing device DD and guided or fed into the closing region of clipping machine CM, in which gathering means 30 and clipping device 20 are arranged for gathering and closing the filled tubular packaging casing M. The supply of thread may be also arranged above or below filling tube 10 and/or clipping device 20.

The feeding of the thread can be started before the filling process begins. In such a case, the thread can form a loop which is suspended during the filling of the sausage-shaped product. Alternatively, the feeding of the thread can be started simultaneously with the beginning of the filling process.

During the filling tubular packaging casing M, a length of thread T is dispensed by thread dispensing device DD, that is shorter than the length of tubular packaging casing M which forms a complete sausage-shaped product S. Accordingly, after a length of tubular packaging casing material M which matches the length of the suspended thread T, is filled, the tubular packaging casing M while further being filled, forms a ring, as can be seen in FIG. 1.

After the desired length of tubular packaging casing M is filled, gathering means 30 gather the filled tubular packaging casing M, and form a plait-like portion P thereto.

In specific cases, in which first displacer unit 32 is moved relative to second displacer unit 34 in feeding direction F along center axis A of filling tube 10, for forming an elongated plait-like portion P, a second length of thread T which corresponds to the length of the elongated plait-like portion, may be dispensed by thread dispensing device DD.

In the case that the dispensed length of thread T that extends between the front end of sausage-shaped product S and its rear end, is longer than a desired length, thread dispensing device DD may retract thread T about a defined length such that the remaining length of thread T between the front end and the rear end of sausage-shaped product S matches a predetermined length of thread T.

After thread T extending between the front end and the rear end of sausage-shaped product S has the predetermined length, clipping device 20 places and closes at least one closure clip C at plait-like portion P, for closing the rear end of just filled tubular packaging casing M forming a ring. By said closure clip C, thread T is fixed to the rear end of the just filled tubular packaging casing M.

Clipping device 20 may simultaneously place and close a second closure Clip C at plait-like portion P for closing the front end of the next tubular packaging casing M subsequently to be filled, and for fixing thread T thereto.

Thread T and plait-like portion P are cut upstream closure clip C that closes filled tubular packaging casing M for separating sausage-shaped product S just produced from the remaining supply of tubular packaging casing M and thread T. Sausage-shaped product S may than be removed from clipping machine CM by a respective discharge device.

Figure 2:
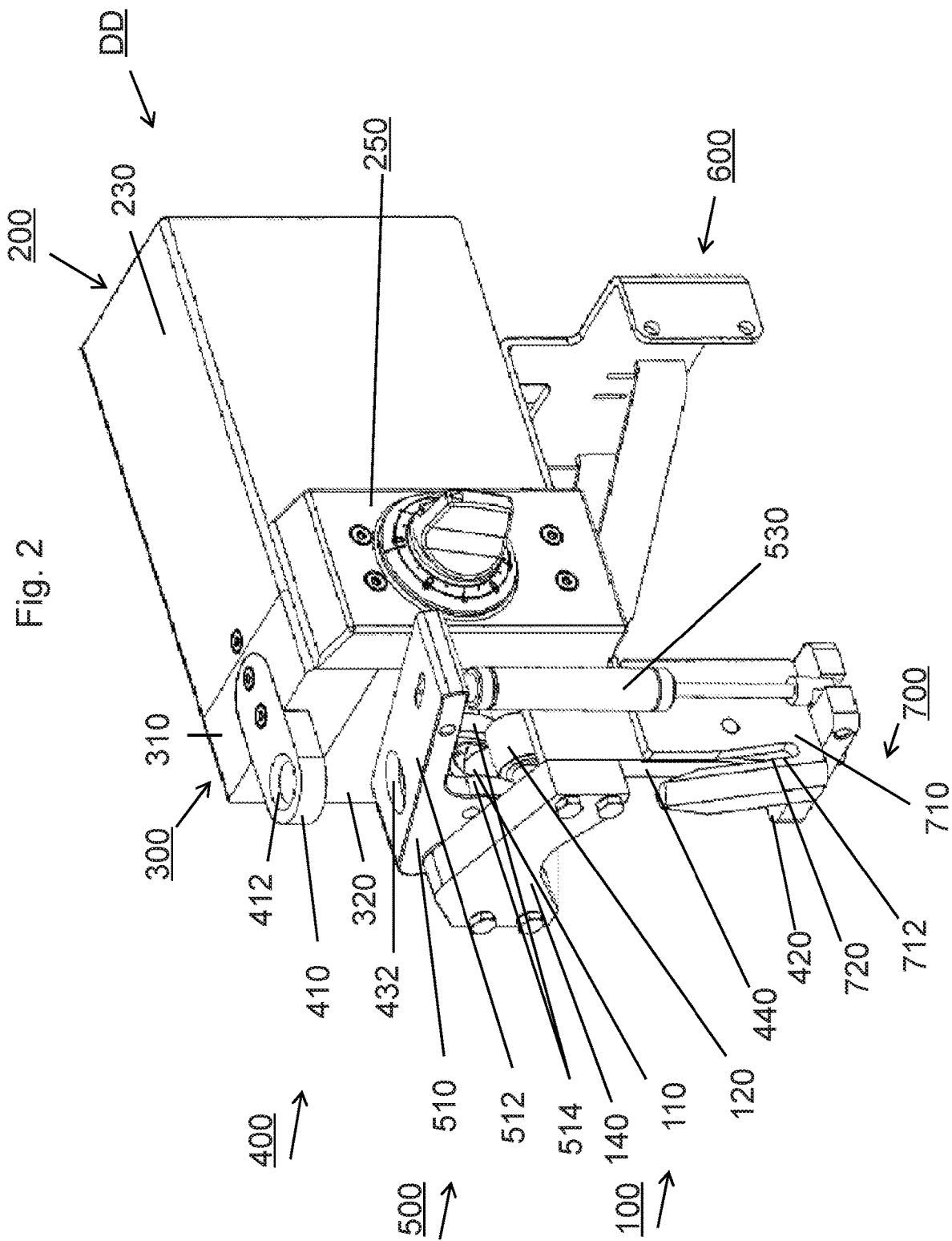
FIG. 2: is a schematic and perspective view to the front side of a thread dispensing device according to the present invention.
Figure 3:
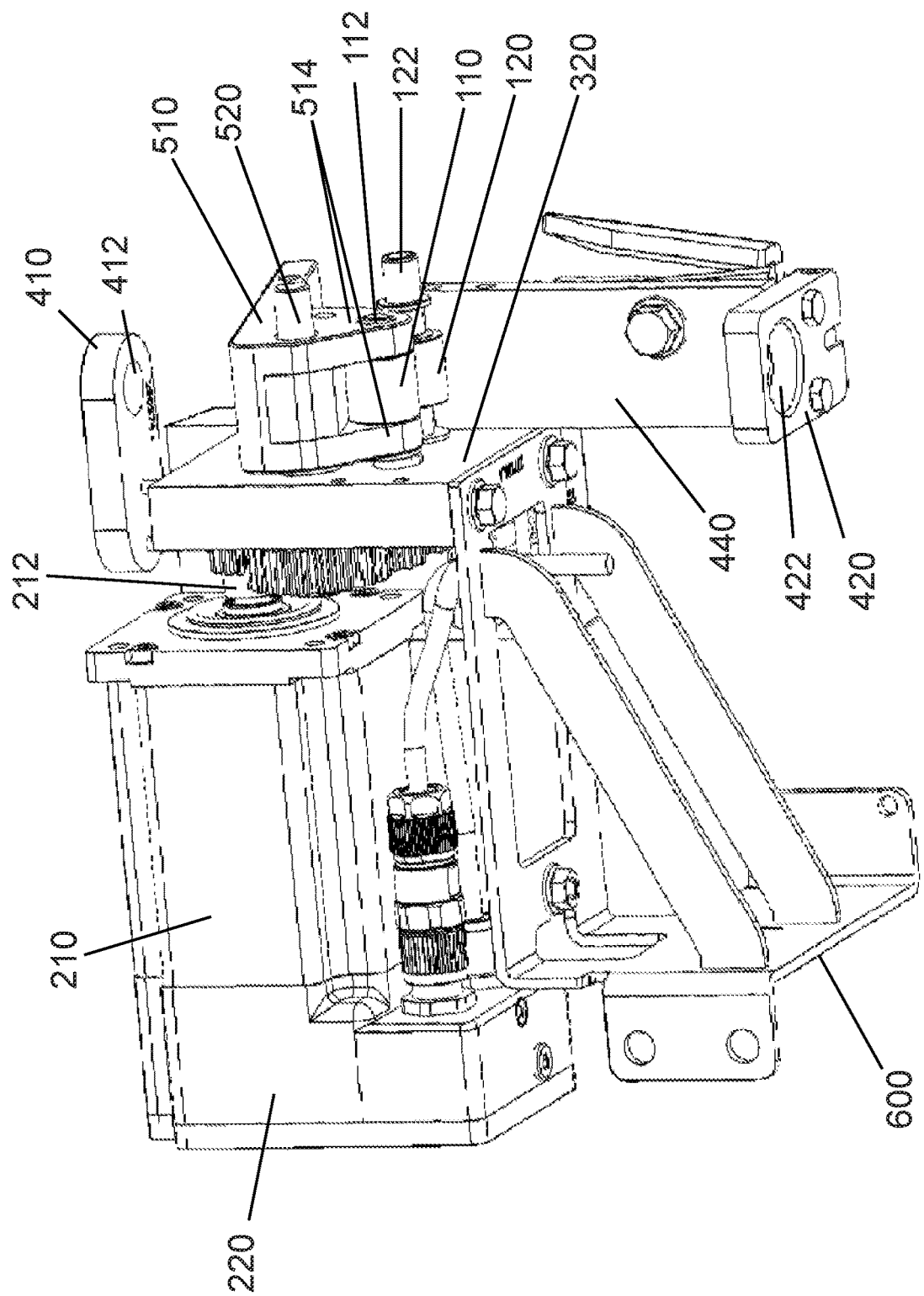
FIG. 3: is a schematic and perspective view to the rear side of the thread dispensing device as shown in FIG. 2.

FIGS. 2 and 3 show an embodiment of a dispensing device for dispensing thread, or thread dispensing device DD.

Thread dispensing device DD comprises a transport unit 100 for transporting thread T, a drive unit 200 for driving transport unit 100, a gear unit 300 for transmitting torque from drive unit 200 to transport unit 100, guide means 400 for guiding thread T through thread dispensing device DD and a shifting unit 500 for reversibly interrupting the transport of thread T. Thread dispensing device T according to FIGS. 2 and 3 further comprises a switch unit 250 for manipulating drive unit 200. The components of thread dispensing device DD are supported by a frame work 600 by which thread dispensing device DD may be mounted to a clipping machine CM. Clipping machine CM can be a new or an already existing machine. In other words, thread dispensing device DD can also be a retrofitting kit for existing machines.

Drive unit 200 includes an electric motor 210, like a stepper motor, connected to a control unit and a respective power source by a connector unit 220 (cf. FIG. 3). Motor 210 and connector unit 220 are covered by a motor coverage 230 as shown in FIG. 2. Motor 210 has a drive shaft 212 that extends into gear unit 300.

Gear unit 300 comprises a gear coverage 310 and a carrier plate 320 for rotatably supporting the movable elements of gear unit 300, like rotation shafts with respective toothed wheels thereon, as it can particularly be seen in FIG. 3 where gear box coverage 310 has been omitted, and as it is explained in detail in conjunction with FIG. 4 below.

Transport unit 100 includes a first cylindrical drive roller 110 and a second cylindrical drive roller 120, the rotation axes of which are arranged parallel to each other in a substantially horizontal plane. Rollers 110, 120 are arranged on rotatably supported shafts 112, 122.

Figure 5:
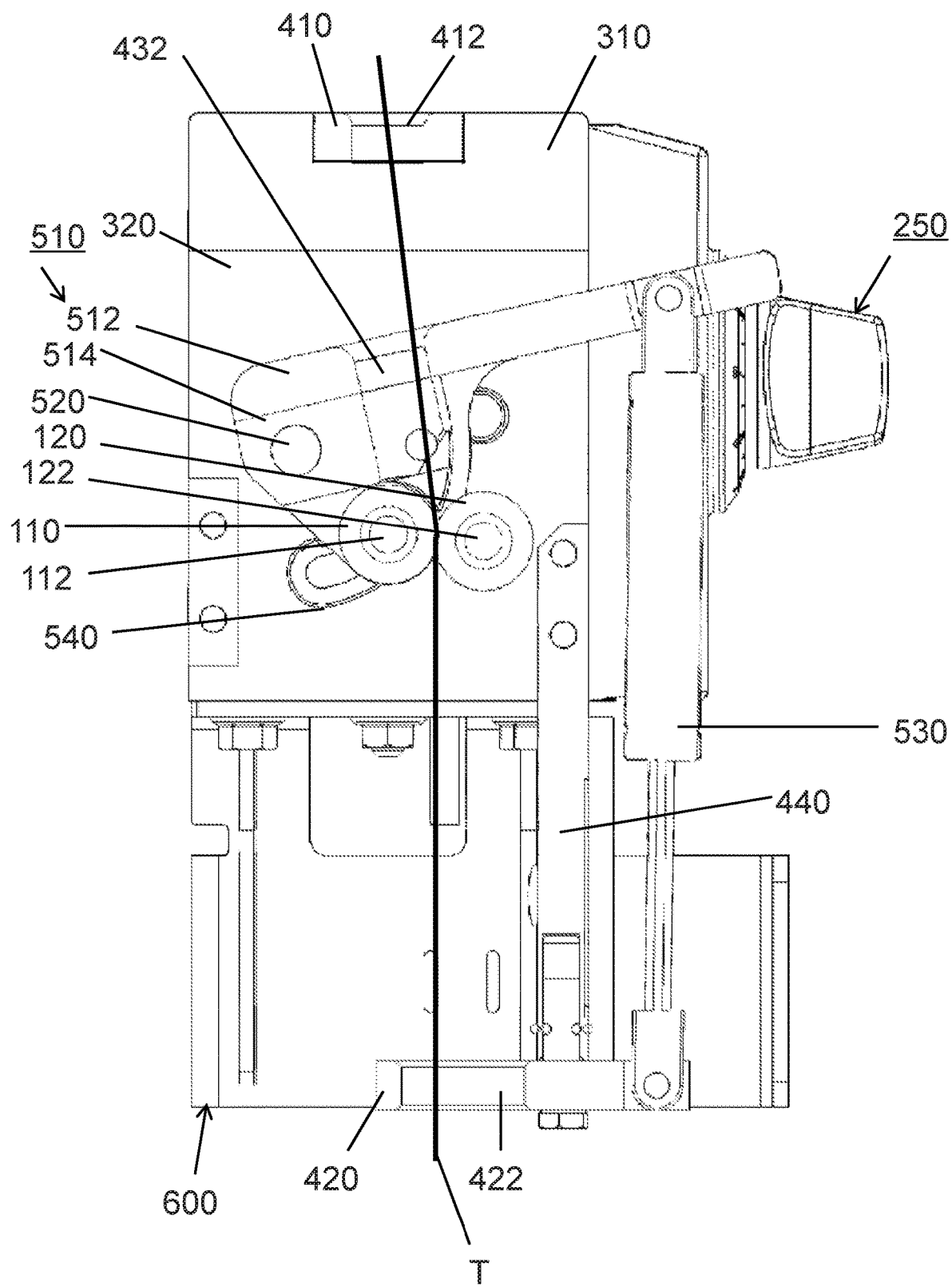
FIG. 5: is a schematic sectional view through the guide means of the thread dispensing device as shown in FIG. 2, along the guide path of the thread.

Rollers 110, 120, according to FIGS. 2, 3 and 5, are in a transport position, in which they abut each other along a horizontal contact line. A thread T when positioned between rollers 110, 120, is forwarded when rollers 110, 120 are driven by drive unit 200.

Shifting unit 500 comprises a shifting element or lever 510 having a plate-shaped actuation portion 512 that extends substantially horizontal and along the left side of carrier plate 320 towards the front side of thread dispensing device DD as shown in FIG. 2. At the rear end of actuation portion 512 of shifting element or lever 510, two lugs 514 extend downwardly from actuation portion 512, parallel to each other and to carrier plate 320, and with a gap between lugs 514 that corresponds to the axial length of drive rollers 110, 120 of transport unit 100 (cf. FIG. 3).

Shifting unit 500 further comprises a pivot shaft 520 that extends horizontally through carrier plate 320 in which shaft 520 is rotatably supported. Lever 510 is mounted to the portion of shaft 520 that extends over carrier plate 320, to be reversibly pivoted about the longitudinal axis of shaft 520. In the region of the lower ends of lugs 514, horizontally arranged and coaxially aligned holes are provided through which shaft 112 of transport unit 100 extends into gear unit 300. In carrier plate 320, a guide means or guide slot 540 is arranged, which has the shape of a circular segment with a center point coinciding with the longitudinal axis of shaft 520. This enables shaft 112 to be pivoted about shaft 520 and in parallel orientation thereto, upon reversible actuation of lever 510. In other words, shaft 112 is moved on an at least substantially circular-shaped trajectory around shaft 520.

Transport unit 100 further includes a support plate 140 arranged parallel to carrier plate 320 of gear unit 300, on its left side in FIG. 2 and with a gap therebetween that corresponds to the width of lever 510. Support plate 140 rotatably supports the left end of shaft 122 of transport unit 100 and the left end of shaft 520 of shifting unit 500. In FIG. 3, support plate 140 has been omitted such that the left ends of shafts 122 and 520 are visible.

Guide means 400 for guiding thread T through thread dispensing device DD include an upper guide element 410 coupled to the upper side of gear box coverage 310, in a recess having a shape that corresponds to the shape of guide element 410, and extends leftwards in FIG. 2. At its left end, plate-like guide element 410 has a vertical through-hole 412 aligned approximately vertically above the contact line of rollers 110, 120 of transport unit 100. Below rollers 110, 120, viewed in a vertical direction, a lower guide element 420 of guide means 400 is arranged with a through-hole 422 aligned preferably and at least approximately with through-hole 412 of guide element 410 and the contact line between rollers 110, 120. Guide element 420 is mounted to carrier plate 320 by a vertically arranged plate-like holder 440.

Additionally, in actuation portion 512 of lever 510 of shifting unit 500, a guide hole 432 is provided and preferably aligned with through-hole 412 of guide element 410, the contact line between rollers 110, 120 and through-hole 422 of guide element 420.

Guide element 410 with hole 412, guide hole 432 in lever 510 and guide element 420 with hole 422 form guide means 400 for guiding thread T through thread dispensing device DD, as can be seen in FIG. 5 which is a schematic sectional view through guide means 400 of thread dispensing device DD along the guide path of thread T.

As particularly can be seen in FIG. 2, a return member 530 is arranged between the front end of actuation portion 512 of lever 510 and the front end of guide element 420. Return member 530, in the embodiment of FIGS. 2 and 3, is a pneumatic spring including a piston/cylinder arrangement with pressurized gas in the cylinder. In FIGS. 2 and 3, lever 510, and thus, rollers 110, 120 are in a transport position with rollers 110, 120 are in contact with each other such that thread T arranged between rollers 110, 120 (cf. FIG. 5), is forwarded when drive 200 is actuated.

For interrupting the transport or feeding of thread T, lever 510 may be pushed downwardly on its end at which pneumatic spring 330 is attached (cf. FIG. 3), for example by an operator, whereby first roller 110 is shifted about the pivot axis or shaft 520 of lever 510 along guide slot 540 and away from second roller 120 into a release position.

Return member or pneumatic spring 530 acts on lever 510 such that, when lever 510 is released by the operator, lever 510 and first roller 110 are automatically be shifted back into the transport position as shown in FIGS. 2 and 3.

Additionally, a cutting device or cutter unit 700 is provided at plate-like holder 440 which can in particular be seen in FIG. 2. Cutter unit 700 is arranged below or downstream of transport unit 100, referred to the feeding or dispensing direction of thread T which is oriented from upper guide element 410 to lower guide element 420, and includes a blade holder 710 which is fixed to plate-like holder 440. Blade holder 710 has a vertically extending slot 712. A blade 720 is clamped between blade holder 710 and plate-like holder 440 such that a sharpened edge of blade 720 extends into slot 712. Cutter unit 700 may be used for example by an operator for cutting thread T, e.g. when exchanging thread T by another kind of thread T, for cleaning the free end of thread T before inserting it into thread dispensing device DD, or for removing defective portions of thread T.

Figure 4:
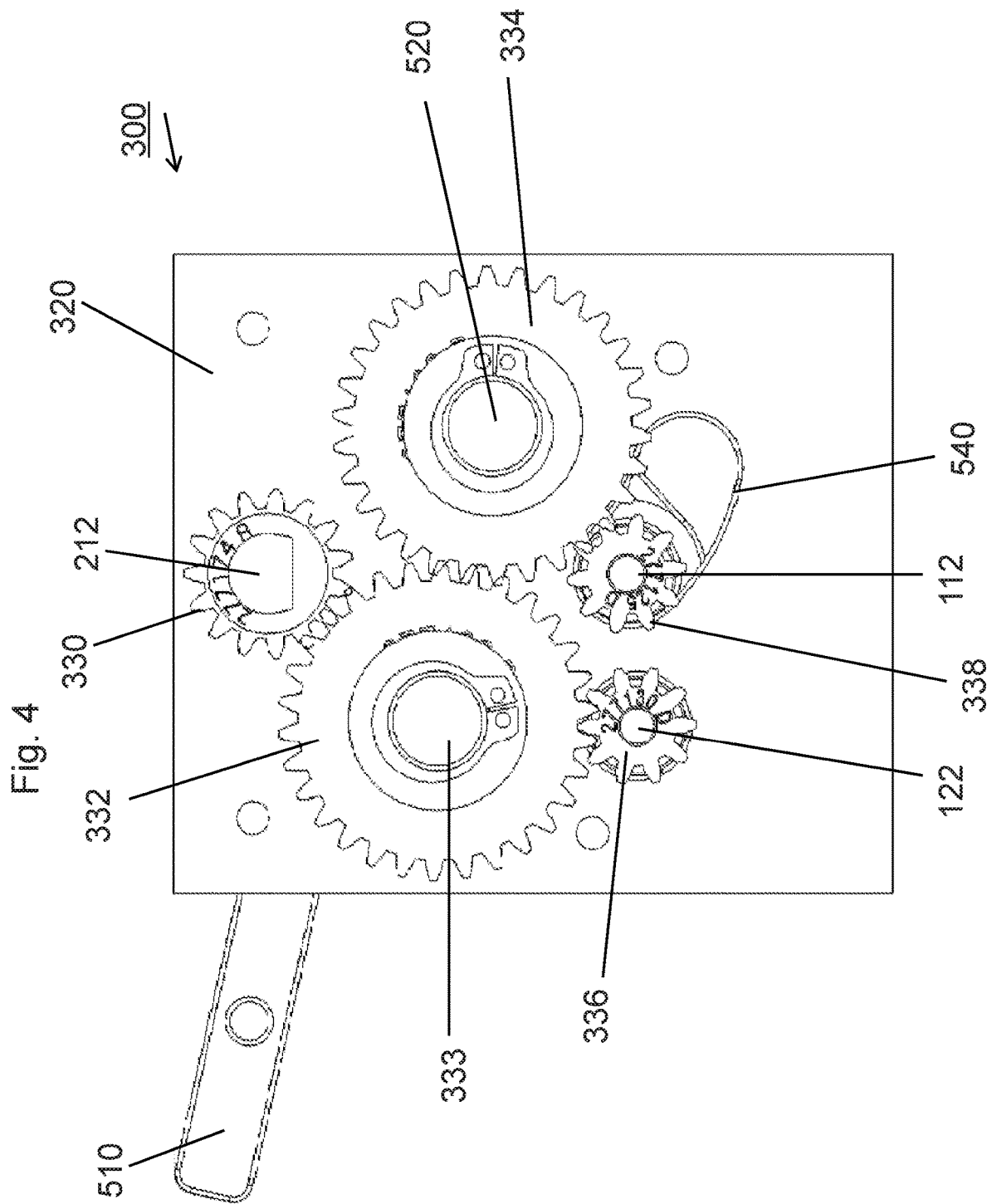
FIG. 4: is a sectional view through the gear unit of the thread dispensing device as shown in FIG. 2.

FIG. 4 is a sectional view through gear unit 300 of thread dispensing device DD viewed from stepper motor 210.

Besides the elements already explained in conjunction with FIGS. 2 and 3, like gear coverage 310 and carrier plate 320, gear unit 300 further comprises a pinion 330, a first intermediate gearwheel 332, a second intermediate gearwheel 334, a first drive gearwheel 336 and a second drive gearwheel 338.

Pinion 330 is arranged at that portion of shaft 212 of motor 210 which extends into gear unit 300, and engages first intermediate gearwheel 332 that is arranged on a shaft 333 which is rotatably supported by carrier plate 320. First intermediate gearwheel 332 engages second intermediate gearwheel 334 rotatably arranged at pivot shaft 520 of shifting means 500, and first drive gearwheel 336 on shaft 122 of transport unit 100. Second intermediate gearwheel 334 engages second drive gearwheel 338 mounted on shaft 112 of transport unit 100.

As can be seen in FIG. 4, pinion 330 when clockwise driven by motor 210, drives first intermediate gearwheel 332 counterclockwise. First intermediate gearwheel 332 in turn rotates second intermediate gearwheel 334 and first drive gearwheel 336 in clockwise direction. Accordingly, second drive gearwheel 338 is rotated counterclockwise by second intermediate gearwheel 334.

First roller 110 of transport unit 100 is mounted on shaft 112 driven by second drive gearwheel 338, and second roller 120 is mounted on shaft 122 driven by first drive gearwheel 336. Thus, while pinion 330 is driven clockwise, thread T arranged between rollers 110, 120 is transported downwardly through thread dispensing device DD. Accordingly, when pinion 330 is driven counterclockwise, thread T is fed upwardly through thread dispensing device DD.

For producing sausage-shaped products S, particularly ring-shaped sausage-shaped products, in clipping machine CM, tubular packaging casing M is stored on filling tube 10. The front end of tubular packaging casing M is closed by a closure clip C, and the front end of thread T is fixed to the front end of tubular casing M by said closure clip C.

Moreover, the front end of a thread T is pulled by an operator from thread supply TS and is threaded in upper guide element 410. Thread T is then pulled further by the operator to transport elements 110, 120 and is guided therebetween wherein transport element 110 is shifted away from transport element 120 via pushing lever 510 downwardly by the operator. When thread T is positioned between transport elements 110, 120, the operator releases lever 510 so that transport element 110 comes in contact once again with transport element 120. Finally, thread T is threaded through lower guide element 420 and is fed to the closing region of clipping machine CM.

Together with the filling process or at a predetermined time point before or after the filling process has been started, a predefined length of thread is dispensed by thread dispensing device DD. Thereafter, the transport of thread T is stopped and thread T is clamped in thread dispensing device DD, e.g. by first and second rollers 110, 120, for preventing thread from being further pulled-off from thread supply TS.

The filling process is continued until a desired portion of filling material has been fed through filling tube 10 into tubular packaging casing M, or the filled tubular packaging casing M has a desired length. During filling, the filled tubular packaging casing reaches a length that corresponds to the length of thread T dispensed by thread dispensing device DD, and the front end of the filled tubular casing M is held in its position relative to filling tube 10. During the further filling process, and dependent on the suspended length of thread T, filled tubular packaging M forms a ring or at least a segment of a ring.

After a predetermined portion of filling material has been fed into tubular packaging casing M, feeding of filling material is stopped and the filled tubular packaging casing is gathered by gathering means 30, for forming a plait-like portion P thereto.

Dependent on the length of thread between the front end of filled tubular casing M and its rear end, clipping device 20 places and closes two closure clips C to plait-like portion P, a first closure clip C for closing the rear end of filled tubular casing M, and a second closure clip C for closing the front end of the tubular casing material M subsequently to be filled. Thereafter, plait-like portion P and thread T are cut by a respective cutting device between the two closure clips C for separating sausage-shaped product S from the remaining tubular packaging casing M and from the supply of thread T.

It has to be noted that it is also possible to place and close only one closure clip C to plait-like portion P, for closing the rear end of filled tubular packaging casing M, and in a further clipping step, to place a further closure clip C the close the front end of tubular packaging casing M subsequently to be filled.

In both cases, thread T is fixed to the respective end of tubular packaging casing M by said closure clip C.

In the case that the length of thread T between the front end of filled tubular casing M and its rear end exceeds a desired length, e.g. process-related, thread T may be pulled back by thread dispensing device DD about a respective length, after filled tubular casing M has been gathered by gathering means 30, but before a closure clip C has been placed and closed at plait-like portion P by clipping device 20.

In some cases, it is desired to form an elongated plait-like portion P to the filled tubular packaging casing M, e.g. for producing slack filled sausages. For producing slack filled sausage, displacer unit 32 of gathering means 30 positioned downstream displacer unit 34, is moved in feeding direction F away from displacer unit 34 in a spreading operation, thereby, an elongated plait-like portion P is formed to filled tubular packaging M.

During the spreading operation or at a suitable time point before or after the spreading operation has been started, an additional length of thread T may be dispensed by thread dispensing device DD. This additional length corresponds to the length of the spreading path about which displacer unit 32 is moved away from displacer unit 34. Particularly when processing sensitive packaging casing, the casing material is preserved, since possible friction between thread T and tubular packaging casing M during the spreading operation is prevented.

Thread dispensing device DD includes a motor 210 which may be a stepper motor, and a control unit for controlling motor 210. The control unit may be provided with a large number of programs for controlling motor 210, e.g. the dispensing speed, the dispensed length, or the number of lengths dispensed during one production cycle. Accordingly, thread dispensing device DD may be adapted to a great variety of products to be produced on clipping machine M.

The control unit of thread dispensing device DD may be incorporated in thread dispensing device DD, such that it may work independently from clipping machine CM, or only needs to be provided with a signal corresponding to the start of a production cycle, or the production process at all. Thread dispensing device DD, after the receipt of a respective start signal, may than operate independent from clipping machine CM and on the basis of a selected program stored in the control unit of thread dispensing device DD.

Alternatively, the control unit of thread dispensing device DD may also be incorporated in clipping machine CM. In this case, while selecting a product to be produced by clipping machine CM, a program for controlling thread dispensing device DD may automatically be selected by clipping machine CM. Otherwise, also the operator may manually select a program for controlling thread dispensing device DD at the control unit of clipping machine CM.

In a simple version of thread dispensing device DD, selecting switch 250 is provided at thread dispensing device DD for selecting only the length of thread T to be dispensed, and an operator starts and stops thread dispensing device DD for each production cycle. Naturally, thread dispensing device DD may also designed to receive a start or stop signal from the control unit of clipping machine CM, and the operator selects the length of thread T to be dispensed by switch 250.

In another embodiment of thread dispensing device DD, switch 250 may be used for setting other parameters, like the length of breaks between two subsequent dispensing operations.

Switch 250 may also be used for setting thread dispensing device DD into or out of operation.

Depending on the program presently running for controlling clipping machine CM or thread dispensing device DD, parameters of thread dispensing device DD may also varied during the production process by switch 250, e.g. in adaption to varying properties of tubular packaging casing M or thread T.

As explained in conjunction with FIG. 4, the first and second roller 110, 120 of transport unit 100 are both driven by drive unit 200. Thereby, slip is prevented between thread T and one of rollers 110, 120, and wear is prevented and thread T is surely transported straight through transport unit 100.

Additionally, the specific construction of shifting unit 500 enables the removal of first roller 110 from second roller 120, without interrupting the drive of first roller 110, since second drive gearwheel 338 stays in engagement with second intermediate gearwheel 334 while first roller 110 is moved away from second roller 120. When pushing the front end of actuation portion 512 of lever 510 downwards, lever 510 rotates about shaft 520. Shaft 112 with first roller thereon, is moved along a circular path about shaft 520 and within guide slot 540 in carrier plate 320. Accordingly, second drive gearwheel 338 at shaft 122 also rotates about shaft 520 which also carries second intermediate gearwheel 334 which is engaged with second drive gear wheel 338. Thus, during the pivot movement of lever 510, second intermediate gearwheel 334 and second drive gearwheel 338 remain in engagement with each other, and first roller 110 at shaft 112 is driven also during the pivot movement of lever 510. Thereby, the transport of thread T as well as the interruption of the transport of thread T may securely be controlled, and slip and wear between thread T and rollers 110, 120 is prevented. When releasing lever 510, return member 530 automatically pushes lever 510 into the transport position shown in FIG. 2.

Thread T in the sense of the present invention may be any longitudinally extending material, like strings, filaments or ribbons. The design of thread dispensing device DD allows the transport of thread of various materials and cross-section. Thus, it is possible to transport flat material, which may be attached to a tubular packaging of a respective product, like a tubular net for producing netted fruits or any other netted items. The ribbon attached to such a net product may form a handle. Alternatively or additionally, a ribbon may also be used a label with information regarding the packaged product printed thereon.

Thread dispensing device DD may also be used to dispense thread to other machines than packaging machines. Thread dispensing device DD may be used to dispense welding wire to a respective welding machine, or to dispense plastic wire to a 3-D-printing device.

The specific embodiment according to FIGS. 2 to 5 has been explained in conjunction with a clipping machine for producing sausage-shaped products S. Accordingly, thread dispensing device DD is mounted to a clipping machine CM such that thread T may be dispensed into the closing region of clipping machine CM, where gathering means 30 and clipping device 20 are arranged. Thread dispensing device DD may be arranged above or below the closing region of clipping machine CM, as long as an operator may securely operate thread dispensing device DD and thread T is reliably dispensed to clipping machine CM.

Additionally, in order to ensure a correct feeding of thread to clipping machine CM, respective guide elements, like guide rollers, may be provided for guiding thread T dispensed by thread dispensing device DD into the closing region of clipping machine CM for accurately being grasped by gathering means 30.

Return member 530 has been described as being a pneumatic spring including a piston/cylinder arrangement with pressurized gas in the cylinder, for automatically pushing lever 510, and thus, transport unit 100 into its operation position, after being manually actuated. However, it is also possible to design the return member such that it may automatically be actuated, e.g. including a separate drive, like an electric or pneumatic drive, and being controlled by a program for controlling thread dispensing device DD. The respective control program may include steps for interrupting the transport of thread T, or to start the transport of thread T. Accordingly, it is also possible to establish an emergency routine which automatically interrupts the transport of thread T in emergency case.

What is claimed is:

1. A device for dispensing thread, comprising a transport unit having at least a first and a second transport element for a defined transport of a thread;
   a drive unit for driving the first and second transport element; and
   a shifting unit for reversibly shifting the first transport element relative to the second transport element.

2. The dispensing device according to claim 1,
   wherein the first and second transport elements are at least approximately cylindrical rollers having longitudinal rotation axes which are arranged parallel to each other.

3. The dispensing device according to claim 1,
   wherein the shifting unit includes guide means for guiding reversibly first transport element away from and back to the second transport element.

4. The dispensing device according to claim 1,
   wherein the transportation unit is coupled to the drive unit via a gear unit.

5. The dispensing device according to claim 1, wherein the drive unit includes a stepper motor controlled by a control unit.

6. The dispensing device according to claim 1, further comprising a switch unit for selecting a predefined operation mode.

7. The dispensing device according to claim 1, further comprising a guide unit for guiding thread through the dispensing device.

8. The dispensing device according to claim 1, further comprising a cutting device for cutting the thread.

9. The dispensing device according to claim 1, wherein the shifting means include a manually operable lever.

10. A clipping machine for producing sausage-shaped products, like sausages, with a tubular or bag-shaped packaging casing containing a flowable filling material and a suspension element attached to the tubular or bag-shaped casing, wherein the suspension element consists of thread, comprising:

a filling tube on which the tubular or bag-shaped packaging casing is stored and through which filling material is fed in a feeding direction into the tubular or bag-shaped packaging casing, gathering means for gathering the filled tubular or bag-shaped packaging casing and for forming a plait-like portion thereto, a clipping device for applying at least one closure means, like a closure clip, to the plait-like portion for closing the just filled portion of the tubular or bag-shaped packaging casing, and a device for dispensing thread according to claim 1.

11. A method for dispensing thread by a thread dispensing device, including the steps of:

providing a supply of thread, feeding thread by at least a first and second transport element of a transport unit of the thread dispensing device, and reversibly shifting the first transport element relative to the second transport element for transporting thread or for interrupting the feeding of thread.

12. The method according to claim 11, further comprising the step of guiding thread through a guide unit of the dispensing device.

13. A method for producing sausage-shaped products, like sausages, with a tubular or bag-shaped packaging casing containing a flowable filling material and a suspension element attached to the tubular or bag-shaped casing, wherein the suspension element consists of thread, including the steps of:

feeding filling material through a filling tube in a feeding direction into the tubular or bag-shaped packaging casing, gathering the filled tubular or bag-shaped packaging casing and forming a plait-like portion thereto, applying at least one closure means, like a closure clip, to the plait-like portion for closing the just filled portion of the tubular or bag-shaped packaging casing, feeding thread by at least a first and second transport element of a transport unit of a thread dispensing device in a transportation direction, and reversibly shifting the first transport element relative to the second transport element for transporting thread or for interrupting the feeding of thread.

14. The method according to claim 13, further comprising the step of guiding thread through a guide unit of the dispensing device.

15. The method according to claim 13, further comprising the step of selecting a predefined operation mode for operating the thread dispensing device.

* * * * *